N. M. ANDERSON.
AUTOMOBILE.
APPLICATION FILED JAN. 11, 1907.
910,768.
Patented Jan. 26, 1909.
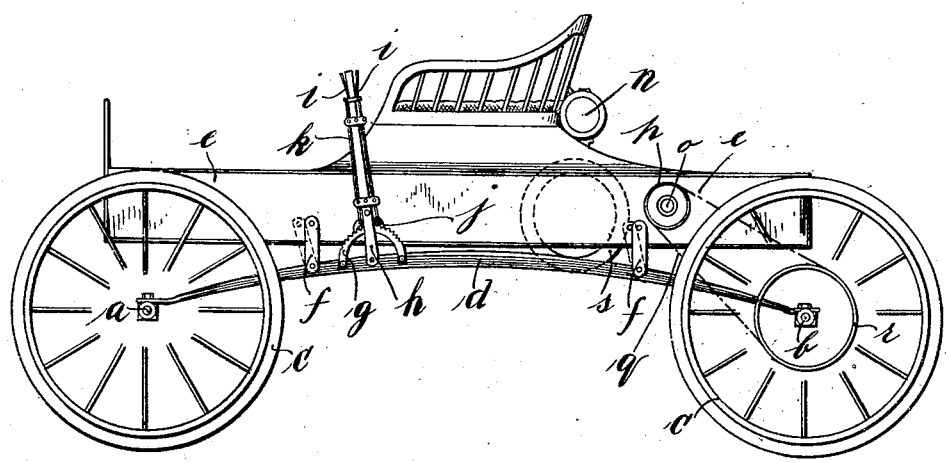
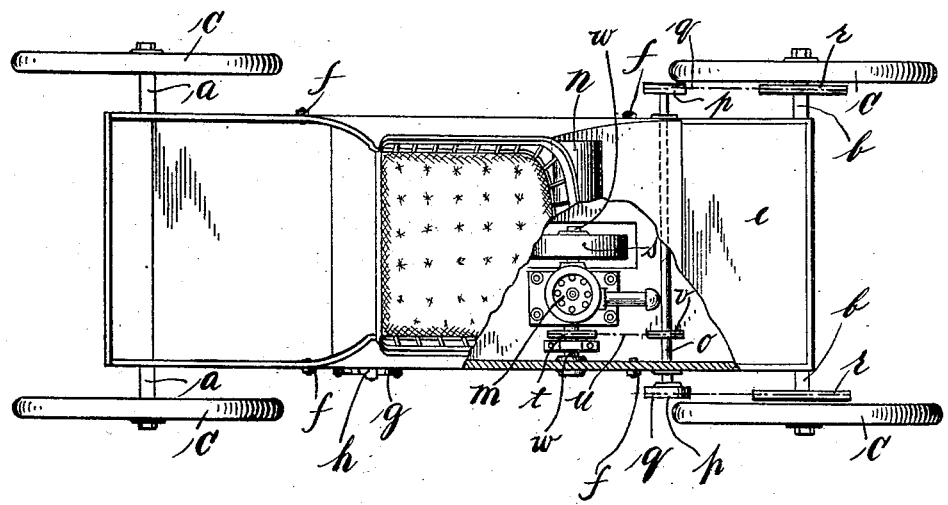
Witnesses
Harry Helig
M. Hamilton.
Newton M. Anderson, Inventor
By his Attorney
James Hamilton

UNITED STATES PATENT OFFICE.

NEWTON M. ANDERSON, OF BEDFORD, INDIANA, ASSIGNOR, BY DIRECT AND MESNE ASSIGNMENTS, TO THE BUGGY CAR COMPANY, OF CINCINNATI, OHIO, A CORPORATION OF OHIO.

AUTOMOBILE.

No. 910,768.  Specification of Letters Patent.  Patented Jan. 26, 1909.

Application filed January 11, 1907. Serial No. 351,798.

*To all whom it may concern:*

Be it known that I, NEWTON M. ANDERSON, a citizen of the United States, residing at Bedford, in the county of Lawrence and State of Indiana, have invented certain new and useful Improvements in Automobiles, of which the following is a description, reference being had to the accompanying drawings.

My invention relates to improvements in road vehicles, and particularly to that class of road vehicles known as automobiles; and an object of my invention is to provide means whereby the power-transmitting mechanism may be thrown into and out of gear readily.

In the drawings illustrating the principle of my invention and the best mode now known to me of applying that principle, Figure 1 is a side elevation of an automobile in which is embodied my invention; and Fig. 2 is a plan view of the same.

The automobile is provided with front and rear axles $a$ and $b$, respectively, each of which supports a pair of wheels $c$ in the usual manner. Connecting the front and rear axles are two springs $d$, only one of which is shown in Fig. 1 but its mate is precisely similar. The body $e$ of the automobile is pivotally connected with the springs $d$ by four links $f$. Mounted on one of the springs $d$ is a toothed arc $g$ and to this spring is pivotally secured a lever $h$ provided on each side with a thumb-latch $i$ connected with a pawl $j$ by means of the link or strap $k$. The toe or free end of the pawl $j$ engages the teeth of the arc $g$ in the usual manner.

The body $e$ carries an engine $m$ and a gasolene tank $n$ connected therewith; and the engine $m$ drives the shaft $w$ upon one end of which is mounted the sprocket $t$ connected by the chain $u$ with the sprocket $v$ mounted upon the countershaft $o$. On the other end of the shaft $w$ is mounted the fly-wheel $s$. The countershaft $o$ carries at each end a band pulley $p$ and the rear axle $b$ carries near each end a band pulley $r$. The band pulleys $p$ and $r$ are connected by the bands $q$, as is best shown in Fig. 2.

When the body $e$ of the vehicle is swung to the rear by means of the lever $h$, it carries with it the engine and the countershaft and loosens the bands $q$; while movement of the body in the other direction (or to the front) results in the tightening of the bands and the application of the power to the rear axle.

I am aware of the patent granted to Louis Creanche, No. 695,541, March 18, 1902, and disclaim all that is therein shown.

I claim:

An automobile consisting of a pair of axles; wheels mounted thereon; a pair of springs which extend from front to rear of the automobile and the ends of which are supported by said axles; a vehicle body; links which pivotally connect said springs and vehicle body; mechanism for swinging said body on said links from front to rear; an engine mounted in said body; power-transmitting devices connected with said engine and mounted in said body; means for connecting said devices and one of said axles; and means for locking said body in its adjusted position.

NEWTON M. ANDERSON.

Witnesses:
A. B. DYE,
E. E. TANNER.